United States Patent [19]

Franke

[11] Patent Number: 5,728,851
[45] Date of Patent: Mar. 17, 1998

[54] PROCESS FOR REMOVING OIL FROM DAIRY FOOD PRODUCTS

[75] Inventor: Henry L. Franke, Baton Rouge, La.

[73] Assignee: University Research & Marketing, Baton Rouge, La.

[21] Appl. No.: 425,893

[22] Filed: Apr. 21, 1995

Related U.S. Application Data

[63] Continuation-in-part of PCT/US/11394 filed Dec. 31, 1992, which is a continuation-in-part of Ser. No. 815,700, Dec. 31, 1991, Pat. No. 5,281,732.

[51] Int. Cl.$^6$ .......................................... C07C 1/00
[52] U.S. Cl. ........................... 554/16; 554/12; 554/9; 554/8; 426/425; 426/429; 426/417

[58] Field of Search .................... 426/417, 425, 426/429; 554/12, 9, 8, 16

[56] References Cited

FOREIGN PATENT DOCUMENTS 9114373  10/1991  WIPO.

*Primary Examiner*—Gary Geist
*Assistant Examiner*—Deborah D. Carr
*Attorney, Agent, or Firm*—Henry E. Naylor

[57] ABSTRACT

A process for removing fats and oils from prepared animal-derived fried-derived food products, particularly fried meat, poultry, and fish products. The method involves treating the animal-derived fried-derived food product with a normally gaseous solvent at effective temperatures and pressures.

5 Claims, No Drawings

PROCESS FOR REMOVING OIL FROM DAIRY FOOD PRODUCTS

CROSS REFERENCE TO RELATED APPLICATIONS

This is a continuation-in-part of PCT/US/11394, filed Dec. 31, 1992 which is U.S. Ser. No. 08/256,258, now U.S. Pat. No. 5,525,746, which is continuation-in-part of U.S. Ser. No. 815,700, filed Dec. 31, 1991, now U.S. Pat. No. 5,281,732.

FIELD OF THE INVENTION

The present invention relates to a process for removing fats and oils from prepared animal-derived fried-derived food products, particularly fried meat, poultry, and fish products. The method involves treating the animal-derived fried-derived food product with a normally gaseous solvent at effective temperatures and pressures.

BACKGROUND OF THE INVENTION

There is a great demand for reduced fat animal-derived fried food products, especially cheeses and fried fast food products Which are substantially free of fat and oil, especially that oil added during frying, and which are also good tasting. Consequently, the food industry is spending substantial sums of money to bring such products to market. One challenge, particularly for fast food producers is to make a product which is substantially reduced in fat content, but which is still appealing to consumers' taste buds. All too often these two competing interests have been mutually exclusive. There are no commercial processes available wherein animal-based food products are first fried, then treated to remove oil, particularly the cooking oil, and lease a good tasting product. It is conventional wisdom in the food industry that to produce a reduced fat food product, a process other than frying in cooking oil must be used.

SUMMARY OF THE INVENTION

In accordance with the present invention, there is provided a process for reducing the amount of oil in an animal-derived cooked food product, which process comprises treating the animal-derived cooked food product with a suitable solvent and separating oil-laden solvent from animal-derived cooked food product of reduced oil content.

Also in accordance with the present invention, there is provided a process for reducing the amount of oil in an animal-derived fried food product, which process comprises:

(a) introducing the fried animal-derived fried food product into an extraction zone;

(b) introducing a normally gaseous solvent into said extraction zone;

(c) maintaining said solvent in contact with said fried animal-derived food product at effective temperatures and pressures and for an effective amount of time to remove a predetermined amount of oil;

(d) collecting the resulting oil-laden solvent; and (e) collecting the fried animal-derived food product having substantially less fats and oils.

In preferred embodiments of the present invention, the animal-derived food product is selected from the group consisting of dairy products, fried chicken, fried chopped meat, and a fried fish product.

In other preferred embodiments of the present invention, a process is provided comprising:

(a) introducing a fried animal-derived food product into an extraction zone;

(b) introducing a normally gaseous solvent into said extraction zone;

(c) providing effective pressures and temperatures that will cause the normally gaseous solvent to become a liquid;

(d) maintaining the solvent, in liquid form in contact with the animal-derived fried food product for a period of time to extract a predetermined amount of oil from said fried food product;

(e) passing the oil-laden solvent mixture from the extraction zone to a separation zone;

(f) separating the solvent from the oil in the separation zone and passing the separated solvent to a storage zone from where it is recycled to the extraction zone; and (g) collecting the oil and an animal-derived food product having substantially less oil than the food product before extraction.

In yet another preferred embodiment of the present invention, the solvent is selected from methane, propane, butane, isobutane, or a mixture thereof, and the temperature of extraction does not exceed the temperatures which will cause degradation of the oil or the food product.

In still another preferred embodiment of the present invention, the extraction zone is evacuated and flushed with an inert gas prior to introduction of the animal-derived food product.

In yet other preferred embodiments of the present invention, an inert gas is used to displace the solvent in the extraction zone as it is passed from the extraction zone to the separation zone.

In other preferred embodiments of the present invention the solvent is passed from the extraction zone to the separation zone under conditions which will maintain the solvent in the liquid phase.

In another preferred embodiment of the present invention, the extraction zone is subjected to conditions which will repeatedly stress and relax the oil and/or solvent molecules.

DETAILED DESCRIPTION OF THE INVENTION

Any prepared oil-bearing animal-derived food product can be used in the practice of the present invention. The term "animal-derived", as used herein, refers to any food product which is derived from the animal kingdom, including foods, such as beef and pork, including pork finds; fish, poultry, preferably chicken; and dairy products, such as cheese. The oil, or fat, can be inherent in the food or it can be extraneous oil which is adsorbed and/or absorbed during a cooking process, particularly by cooking (frying) in cooking oil. It is to be understood that the terms "oil" and "fat" are often used interchangeably herein. Oils are typically liquid at more temperature whereas fats are typically solids. Further, the term "fat-free", as defined by the United States Food and Drug Administration means a food product containing less than about 0.5 wt. % fat, based on the total weight of the food product. The process of the present invention will work substantially equal for both oils and fats. In other words, the present invention will be used on any animal-derived food product that contains oil as an inherent constituent or which was previously cooked in fat or oil. It is particularly applicable on fried foods for removing cooking oils.

Any suitable cooking technique using oil and/or fat, can be used for the animal-derived food product of the present invention. Typically the food product will be a animal-derived fried food product, preferably a so-call "fast food" such as hamburgers (chopped meat), fried chicken, and fried fish products. The thrust of the present invention is not with the actual cooking of the food product, but with removing oils and fats after cooking, without substantially altering the taste of the product. By the practice of the preferred mode of the present invention, the animal-derived food is first fried in oil by any conventional means to ensure superior flavor— then the oil is removed. The oil is removed by use of what applicant refers to as "cold extraction". That is, the animal-derived food product, after frying is contacted with a normally gaseous solvent at relatively low temperatures.

Solvents suitable for use in the present invention are any solvent in which the oil is at least partially soluble and which is non-toxic (eatable). Preferred solvents are those which are normally gaseous at typical atmospheric conditions. That is, those which are a gas at about room temperature (about 70° F.) and atmosphere pressure. Non-limiting examples of preferred solvents include methane, ethane, propane, butane, isobutane, ethylene, propylene, butylene, sulfur dioxide, $CHF_3$, $CClF_3$, $CFBr_3$, $CF_2=CH_2$, $CF_3-CF_2-CF_3$, $CF_4$, $CF_4$, $CH_3-CF_3$, $CHCl_2$, nitrogen, dichlorodifluor methane, dimethylether, methyl fluoride, and halogenated hydrocarbons which are normally gaseous as indicated. Preferred are methane, propane, butane, and mixtures thereof. More preferred are butane, isobutane, and propane. Most preferred is propane. The weight ratio of solvent to agricultural food product will be from about 1:1 to 2:1, preferably from about 1.2:1 to 1.5:1. A co-solvent, such as a $C_2$ to $C_6$ alcohol, preferably ethanol, may be used. If a co-solvent is used it may be used in place of at least about 5 to 90 vol.%, preferably about 5 to 50 vol.%, and more preferably from about 5 to 25 vol.%, of the primary solvent.

In it's simplest form, the present invention can be practiced by merely contacting the animal-derived food product with a suitable solvent, followed by separating the resulting oil-laden solvent from the animal-derived fried product which now contains a reduced amount of oil. Preferred is that the fried food product be substantially free of cooking oil.

In a more detailed procedure, the instant invention can be practiced by introducing the a animal-derived food product into an extraction zone. The extraction zone can be comprised of one or more vessels suitable for the volumes, temperatures, and pressures employed. It may be preferred to use more than one extraction zone. In this way, while one extraction zone is in the extraction stage, another extraction zone, which has previously undergone extraction, can be unloaded of reduced oil-containing product, then reloaded with another charge of animal-derived food product to start another extraction cycle. Non limiting types of vessels which may be used for the extraction zone include fixed-bed, slurry-bed, moving-bed vessels, as well as vessels in which the animal-derived food product is fed therethrough on a belt, or with a screw. It is preferred that the vessel be one in which a fixed-bed of animal-derived food product can be loaded. The animal-derived food product is preferably fed into the extraction zone so as to form a fixed-bed of food product. Although not critical, it is preferred to evacuate the extraction zone prior to introduction of solvent, especially if the solvent is solvent like propane which could possibly form an explosive mixture with air. The evacuation can be conducted in any suitable manner, such as, by use of a vacuum pump or by merely venting the air into the atmosphere as it is displaced by the solvent during solvent loading. Of course, any combustible solvent which contaminates the vented air can be burned-off during venting. It is also within the scope of the present invention that the extraction zone be flushed with an inert gas, preferably nitrogen, prior to introduction of the solvent. It is preferred that the inert gas be heated, for example at a temperature from about 40° to 200° F., preferably from about 80° F. to 150° F. This heated inert gas flush will act as evacuating the extraction zone of air as well as heating, or drying the animal-derived fried food product. It is preferred that the animal-derived food product be dry before being contacted with the solvent to mitigate, or prevent, freezing which may occur during the process. While the heated inert gas can be used to dry the animal-derived food product, it may also be dried by any other appropriate means, such as by heating it by conventional means, including the use of microwaves. Furthermore, after flushing the extraction zone with inert gas, the inert gas can be used to pressurize the extraction zone so that when the normally gaseous solvent is introduced into the extraction zone it is immediately transformed to the liquid state.

The normally gaseous solvent is typically fed into the extraction zone in the vapor state. Although the extraction can be performed with the solvent in a gaseous state, a suitable pressure and temperature can be applied to cause the normally gaseous solvent to liquefy. It is also within the scope of this invention that the normally gaseous solvent be introduced into the extraction zone already in a liquid state. Also within the scope of the present invention is to introduce the solvent into the extraction zone in the form of a mist or spray. The conditions of extraction are sub-critical conditions. That is, the solvent during extraction will be in a form which can be considered a true vapor state or a true liquid state. At critical conditions, the temperature and pressure are such that the liquid and gaseous phases of a pure stable substance become identical. Typically, the temperature will be from about ambient temperature (22° F.), up to about 140° F., preferably from about 70° F. to 130° F., although higher temperatures may also be used. Of course, these temperatures may vary for any given animal-derived food product and solvent combination, and the precise conditions are within the skill of those having ordinary skill in the art given the teaching herein. The pressure maintained in the extraction zone will be a pressure which is effective for maintaining the solvent as a gas or a liquid, preferably a liquid. While this pressure will be dependent on such things as the particular solvent and temperature employed, it will typically range from less than atmospheric pressures to about 200 psig preferably from about 15 psig to 200 psig, more preferably from about 100 psig to 140 psig, when a solvent such as propane is used.

The extraction zone can also be subjected to conditions which will repeatedly stress and relax the oil and/or solvent molecules. Such stressing and relaxation can be caused by fluctuating the pressure of the extraction zone by at least about ¼ psig, preferably by at least about ½ psig, more preferably by at least 1 psig, and most preferably by at least 5 psig. This pressure fluctuation can be caused by actuating and deactuating a piston or diaphragm in the pressure or solvent line. The stressing and relaxation conditions can also be caused by sonication. That is, by subjecting the ingredients of the extraction zone to sonic energy.

The extraction can also be accomplished in more than one extraction. That is, the animal-derived food product can undergo several extractions with fresh solvent in order to assure more complete removal of oil. For example, a first extraction may leave as much as 3 to 10 vol.% of the oil in the material. A substantial amount of this residual oil can then be removed by subjecting the animal-derived fried food product to at least one more extraction with fresh solvent, preferably heated fresh solvent. Of course, the economics of the process must be considered so that the cost of additional extractions does not exceed the value of the added products from the additional extractions.

The animal-derived food product will preferably sit on a filtering means, such as a screen, or membrane filter, or perforated tray, through which the solvent passes with the extracted oil. It is understood that an alternative process feature is one wherein the filtering means is situated between the extraction zone and the separation zone. The solvent is maintained in contact with the animal-derived food product for an effective period of time. That is, for a period of time which will result in the extraction of a predetermined amount of oil. The most desirable extractions are when the resulting animal-derived food product, preferably fried, is substantially free of cooking oil.

The solvent/oil mixture is passed from the extraction zone to a separation zone. If the solvent in the extraction zone is in the liquid phase, then it is preferred that the solvent be passed to the separation zone under conditions which will maintain the solvent as a liquid. It is important that the pressure be maintained in the extraction zone during removal of the solvent and oil so as to prevent unnecessary evaporation of solvent resulting in freezing of the extracted material. A preferred method of maintaining the pressure in the extraction zone during removal of solvent and oil is to introduce a flush gas, preferably an inert gas such as nitrogen, into the extraction zone to replace the leaving solvent/oil mixture. By "inert gas" is meant a gas which will not have a deleterious effect on the food product or extracted oil which can be recycled for cooking a fresh batch of food product. The flush gas will also preferably be one which is dissimilar to the solvent used herein. For example, it will be a gas, which at a given temperature will liquefy at a higher pressure than the solvent. In other words, it is preferred that the inert gas be a gas and not a liquid at extraction conditions. The flush gas replaces the solvent/oil mixture in the extraction zone and maintains substantially the same pressure throughout the solvent/oil removal step. It is preferred that the flush gas be heated. That is, that it be at a temperature that will cause the extracted animal-derived material to be from about 90° F. to 140° F., preferably from about 100° F. to 120° F. This heated flush gas can enhance the recovery of any residual oil and solvent left in the de-oiled animal-derived material. It is also within the scope of this invention that solvent vapor be passed through the deoiled material either in place of the flush gas or following the passage of flush gas. This solvent vapor will act to remove at least a portion of the residual oil left in the deoiled animal-derived material. Any remaining solvent can be removed from the final product by use of a partial pressure.

The separation zone is run under conditions which will enhance the separation of solvent from the oil. It is preferred that heat be applied to enhance this separation. Other conditions for operating the separation zone to enhance solvent/oil separation include distillation, centrifugation, and reduced pressures. The separated solvent is then passed to a storage zone where it can be recycled to the extraction zone. Makeup solvent, if needed, can be added. At least a portion of the recovered solvent can be recycled directly to the extraction zone.

Various ingredients can be added to the animal-derived fried food product either during or after extraction. Non-limiting examples of ingredients that can be added include vitamins and flavorings, including salt. Any suitable method can be used to add the ingredients to the animal-derived fried food product. For example, after extraction, flavoring can be added to the reduced fat food product by spaying the extracted food product with a light layer of oil containing the desired flavor. Flavoring can also be added during extraction by including the flavoring in the solvent used to extract the oil from the animal-derived fried food product. It as been found by the inventor hereof that when flavoring is added to the solvent at least some of the flavoring remains on the food product after extraction. The flavoring can also be added alter extraction by passing additional flavor-containing solvent over the food product before removal from the extraction zone.

The present invention can be more fully understood by reference to the following examples, which are not to be taken as being limited in anyway, and which are presented to illustrate the present invention.

EXAMPLE 1

A sample of fried shimp containing 23.8 wt. % oil was placed into an extraction zone which had first been evacuated of air. Propane was was fed into the extraction zone under conditions so that the propane was in the liquid phase during extraction. The pressure in the extraction zone was peroidically pulsed during extraction by at least about 10 psig. The temperature of extraction was between 70° and 80° F. and the pressure was between about 130 psig and 200 psig. After extraction, the propane was removed from the extraction zone with a nitrogen purge. The fried shimp was than analyzed and it was found that about 90% of the oil had been removed with no appreciable change in taste.

FURTHER EXAMPLES

The above procedure was followed except samples of fried hamburgers and fried chicken were introduced into an extraction. After extraction, the samples were measured for remaining cooking oil. It was found that up to about 95% of cooking oil had been removed from the samples. The taste of the extracted meat samples were substantially the same as that of the original fried meat products.

What is claimed is:

1. A process for removing fat from cheese, which process comprises:

(a) introducing cheese into an extraction zone;

(b) introducing a normally gaseous solvent into said extraction zone;

(c) extracting oil from said cheese by maintaining the solvent in contact with the food product for an effective amount of time to extract a predetermined amount of fat;

(d) collecting the resulting oil-laden solvent; and (e) collecting said cheese having substantially less fats and oils.

2. The process of claim 1 wherein the solvent is selected from the group consisting of methane, ethane, propane, butane, isobutane, and hexane.

3. The process of claim 2 wherein the solvent is propane.

4. The process of claim 2 wherein the temperature during extraction is from about 60° to 140° F.

5. The process of claim 3 whereto the pressure in the extraction zone during extraction is fluctuated from about 0.25 psig to 50 psig.

* * * * *